United States Patent
Sato

(10) Patent No.: US 9,605,119 B2
(45) Date of Patent: Mar. 28, 2017

(54) METHOD FOR PRODUCING THERMOPLASTIC ELASTOMER COMPOSITION

(71) Applicant: The Yokohama Rubber Co., LTD., Minato-ku, Tokyo (JP)

(72) Inventor: Shun Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 100 days.

(21) Appl. No.: 14/423,083

(22) PCT Filed: Aug. 7, 2013

(86) PCT No.: PCT/JP2013/071396
§ 371 (c)(1),
(2) Date: Feb. 20, 2015

(87) PCT Pub. No.: WO2014/030541
PCT Pub. Date: Feb. 27, 2014

(65) Prior Publication Data
US 2015/0252155 A1    Sep. 10, 2015

(30) Foreign Application Priority Data
Aug. 21, 2012 (JP) .................................. 2012-182253

(51) Int. Cl.
| | | |
|---|---|---|
| B01F 7/00 | (2006.01) |
| B60C 1/00 | (2006.01) |
| C08J 3/00 | (2006.01) |
| C08J 5/18 | (2006.01) |
| F16L 11/04 | (2006.01) |
| C08L 23/28 | (2006.01) |
| B29B 7/60 | (2006.01) |
| C08L 23/08 | (2006.01) |
| C08L 77/00 | (2006.01) |
| B29B 7/46 | (2006.01) |
| B29B 9/06 | (2006.01) |
| B29K 21/00 | (2006.01) |
| B29C 47/60 | (2006.01) |
| B60C 5/14 | (2006.01) |

(52) U.S. Cl.
CPC ............ *C08J 5/18* (2013.01); *B01F 7/00975* (2013.01); *B29B 7/60* (2013.01); *B60C 1/0008* (2013.04); *C08J 3/005* (2013.01); *C08L 23/283* (2013.01); *F16L 11/04* (2013.01); *B01F 2215/0049* (2013.01); *B29B 7/46* (2013.01); *B29B 9/06* (2013.01); *B29C 47/6056* (2013.01); *B29C 47/6087* (2013.01); *B29K 2021/003* (2013.01); *B60C 2005/145* (2013.04); *C08J 2323/26* (2013.01); *C08J 2327/24* (2013.01); *C08J 2329/06* (2013.01); *C08J 2377/02* (2013.01); *C08J 2423/26* (2013.01); *C08J 2427/24* (2013.01); *C08J 2429/06* (2013.01); *C08J 2433/10* (2013.01); *C08J 2477/02* (2013.01); *C08L 23/08* (2013.01); *C08L 77/00* (2013.01)

(58) Field of Classification Search
CPC ..... B60C 1/0008; B29B 7/60; B01F 7/00975; C08J 3/005; C08J 5/18; F16L 11/04; C08L 23/283; C08L 23/16; C08L 23/0869; C08L 29/04; C08L 15/02
See application file for complete search history.

(56) References Cited

U.S. PATENT DOCUMENTS

| | | |
|---|---|---|
| 5,889,112 A | 3/1999 | Shih et al. |
| 2008/0314493 A1 | 12/2008 | Hara |
| 2010/0331452 A1 | 12/2010 | Tsou et al. |
| 2013/0156982 A1 | 6/2013 | Kawaguchi et al. |
| 2014/0088231 A1 | 3/2014 | Hara |

FOREIGN PATENT DOCUMENTS

| | | | |
|---|---|---|---|
| EP | 1 995 275 | 11/2008 | |
| EP | 2 474 570 | 7/2012 | |
| JP | H06-240010 | 8/1994 | |
| JP | H08-259741 | 10/1996 | |
| JP | H08-311251 | 11/1996 | |
| JP | H08-311350 | 11/1996 | |
| JP | H08-510783 | 11/1996 | |
| JP | H11-071466 | 3/1999 | |
| JP | 2002-194096 | 7/2002 | |
| JP | 2007-177229 | 7/2007 | |
| JP | 2010-132850 | 6/2010 | |
| WO | WO 2007/100157 | 9/2007 | |
| WO | WO 2009/048472 | 4/2009 | |
| WO | WO 2009048472 A1 * | 4/2009 | ............ B29C 47/40 |
| WO | WO 2012/035828 | 3/2012 | |

OTHER PUBLICATIONS

International Search report for International Application No. PCT/JP2013/071396 dated Nov. 5, 2013, 4 pages, Japan.

* cited by examiner

*Primary Examiner* — Jeffrey Mullis
(74) *Attorney, Agent, or Firm* — Thorpe North & Western

(57) ABSTRACT

A method for producing a thermoplastic elastomer composition comprising using a twin screw kneader to melt-knead a thermoplastic resin and an elastomer; the twin screw kneader having at least two raw material inlets including a first raw material inlet and a second raw material inlet provided at a position separated by 15D to 38D on a downstream side from the first raw material inlet, where D is a cylinder inside diameter of the twin screw kneader; the elastomer being fed in a divided manner from the first and second raw material inlets; a proportion of the elastomer fed from the second raw material inlet being from 10 to 60 vol % of a total amount of the elastomer; and the elastomer being melt-kneaded in a kneading zone having a length of from 0.5D to 20D in a cylinder axis direction of the twin screw kneader.

8 Claims, 5 Drawing Sheets

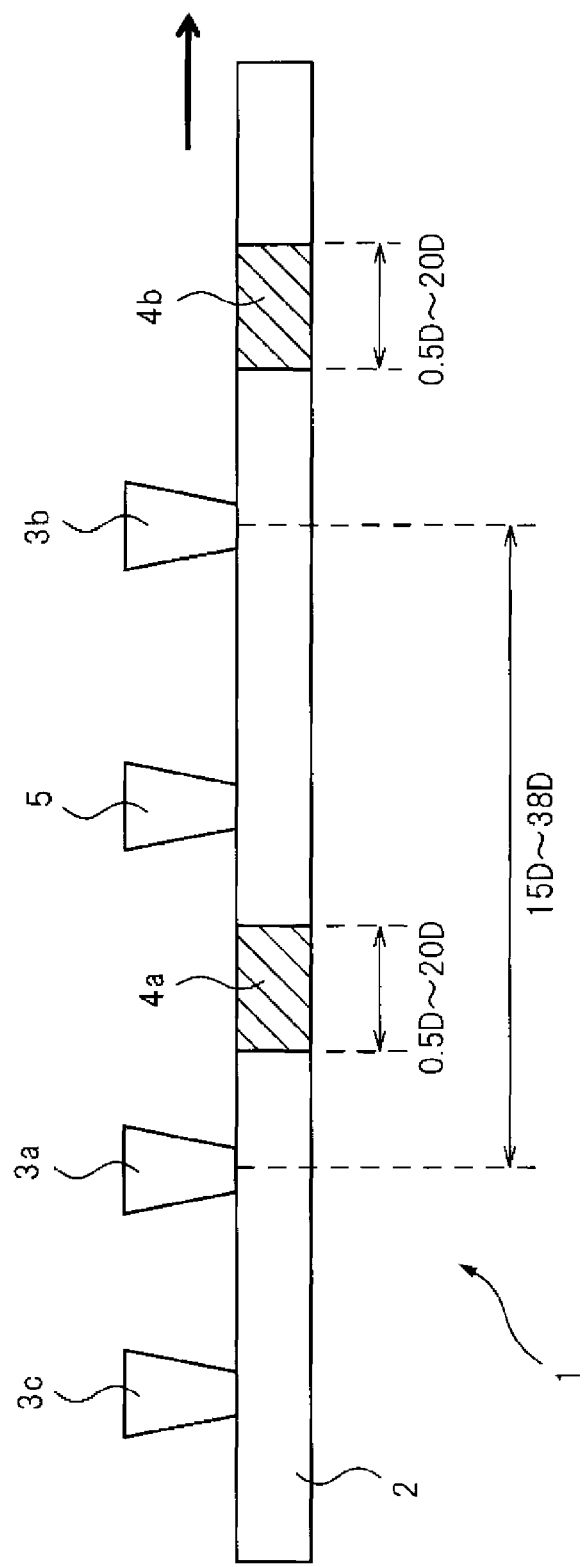

[Table 1]

| | Conventional Example 1 | Working Example 1 | Working Example 2 | Working Example 3 | Working Example 4 | Working Example 5 | Working Example 6 |
|---|---|---|---|---|---|---|---|
| EVOH (parts by volume) | 40 | 40 | 35 | 40 | 40 | 40 | |
| Polyamide resin (parts by volume) | | | | | | | 60 |
| Elastomer type | Mah-EB | Mah-EB | Mah-EB | Mah-EB | Mah-EB | Mah-EB | Mah-EB |
| Amount of elastomer fed from the first raw material inlet (parts by volume) | 60 | 50 | 50 | 25 | 25 | 50 | 20 |
| Amount of elastomer fed from the second raw material inlet (parts by volume) | 0 | 10 | 15 | 35 | 35 | 10 | 20 |
| Crosslinking agent | Present | Present | Present | Present | Present | None | Present |
| Total amount of elastomer fed (parts by volume) | 60 | 60 | 65 | 60 | 60 | 60 | 40 |
| Ratio of the amount of the elastomer fed from the second raw material inlet to the total amount of the elastomer (vol%) | 0.0 | 16.7 | 23.1 | 58.3 | 58.3 | 16.7 | 50.0 |
| Length (XD) in the cylinder axis direction of the twin screw kneader between the first raw material inlet and the second raw material inlet | 30.0 | 30.0 | 30.0 | 20.0 | 35.0 | 30.0 | 30.0 |

FIG. 2A

[Table 1] (continued)

| | Conventional Example 1 | Working Example 1 | Working Example 2 | Working Example 3 | Working Example 4 | Working Example 5 | Working Example 6 |
|---|---|---|---|---|---|---|---|
| Length (XD) of the first kneading zone in the cylinder axis direction of the twin screw kneader | 6.0 | 6.0 | 6.0 | 4.0 | 14.0 | 6.0 | 6.0 |
| Length (XD) of the second kneading zone in the cylinder axis direction of the twin screw kneader | 6.0 | 6.0 | 6.0 | 4.0 | 14.0 | 6.0 | 6.0 |
| Resin temperature (T) of the cylinder tip discharge part at the time of kneading [°C] | 200 | 200 | 200 | 200 | 200 | 200 | 190 |
| Temperature A of the elastomer fed from the second raw material inlet [°C] | | 30 | 40 | 40 | 40 | 30 | 25 |
| Temperature difference (T-A) [°C] | | 170 | 160 | 160 | 160 | 170 | 165 |
| Low-temperature durability index (a) (Conventional Example 1 = 100) | 100 | 130 | 140 | 130 | 125 | 115 | 55 |
| Low-temperature durability index (b) (Conventional Example 1 = 100) | 100 | 100 | 100 | 100 | 100 | 90 | 45 |
| (a/b)×100(%) | 100 | 130 | 140 | 130 | 125 | 128 | 122 |

FIG. 2B

[Table 2]

|  | Working Example 7 | Working Example 8 | Working Example 9 | Working Example 10 | Comparative Example 1 | Comparative Example 2 | Comparative Example 3 |
|---|---|---|---|---|---|---|---|
| EVOH (parts by volume) | 30 | 50 | 40(1) | 60 | 40 | 40 | 80 |
| Polyamide resin (parts by volume) | 10 |  |  |  |  |  |  |
| Elastomer type | Mah-EB | Br-IPMS | Mah-EB | E-GMA | Mah-EB | Mah-EB | Mah-EB |
| Amount of elastomer fed from the first raw material inlet (parts by volume) | 40 | 40 | 25 | 30 | 55 | 20 | 10 |
| Amount of elastomer fed from the second raw material inlet (parts by volume) | 20 | 10 | 35 | 10 | 5 | 40 | 10 |
| Crosslinking agent | Present | None | Present | None | Present | Present | None |
| Total amount of elastomer fed (parts by volume) | 60 | 50 | 60 | 40 | 60 | 60 | 20 |
| Ratio of the amount of the elastomer fed from the second raw material inlet to the total amount of the elastomer (vol%) | 33.3 | 20.0 | 58.3 | 25.0 | 8.3 | 66.7 | 50.0 |
| Length (XD) in the cylinder axis direction of the twin screw kneader between the first raw material inlet and the second raw material inlet | 30.0 | 30.0 | 30.0 | 30.0 | 30.0 | 30.0 | 30.0 |

FIG. 3A

[Table 2] (continued)

| | Working Example 7 | Working Example 8 | Working Example 9 | Working Example 10 | Comparative Example 1 | Comparative Example 2 | Comparative Example 3 |
|---|---|---|---|---|---|---|---|
| Length (XD) of the first kneading zone in the cylinder axis direction of the twin screw kneader | 6.0 | 6.0 | 6.0 | 6.0 | 6.0 | 6.0 | 6.0 |
| Length (XD) of the second kneading zone in the cylinder axis direction of the twin screw kneader | 6.0 | 6.0 | 6.0 | 6.0 | 6.0 | 6.0 | 6.0 |
| Resin temperature (T) of the cylinder tip discharge part at the time of kneading [°C] | 230 | 230 | 200 | 200 | 200 | 200 | 180 |
| Temperature A of the elastomer fed from the second raw material inlet [°C] | 40 | 30 | 40 | 40 | 30 | 110 | 30 |
| Temperature difference (T-A) [°C] | 180 | 200 | 160 | 160 | 170 | 90 | 150 |
| Low-temperature durability index (a) (Conventional Example 1 = 100) | 150 | 95 | 130 | 80 | 110 | 115 | 20 |
| Low-temperature durability index (b) (Conventional Example 1 = 100) | 120 | 75 | 100 | 65 | 100 | 100 | 20 |
| (a/b)×100(%) | 125 | 127 | 130 | 123 | 110 | 115 | 100 |

Note: (1)30 parts by volume were fed from the third raw material inlet, and 10 parts by volume were fed from the first raw material inlet.

FIG. 3B

METHOD FOR PRODUCING THERMOPLASTIC ELASTOMER COMPOSITION

TECHNICAL FIELD

The present technology relates to a method for producing a thermoplastic elastomer composition. More specifically, the present technology relates to a method for producing a thermoplastic elastomer composition having excellent low-temperature durability, a thermoplastic elastomer composition produced by the method, and a product obtained from the thermoplastic elastomer composition.

BACKGROUND

There are known thermoplastic elastomer compositions having an excellent balance of air permeation resistance and flexibility, the compositions being obtained by dispersing a specific elastomer component into a specific thermoplastic resin matrix as a discontinuous phase (Japanese Unexamined Patent Application No. H08-259741A).

For example, a thermoplastic resin elastomer composition produced by melt-kneading a modified polyamide resin, an ethylene-vinyl alcohol copolymer, and a maleic anhydride modified ethylene-propylene copolymer with a twin screw kneader and an example in which a pneumatic tire using a film consisting of the composition as an inner liner is produced have been reported (Japanese Unexamined Patent Application Publication No. 2010-132850A).

The elastomer component in a thermoplastic elastomer composition originally has an effect of improving the low-temperature durability of the thermoplastic elastomer composition. However, when producing an thermoplastic elastomer composition by melt-kneading a thermoplastic resin and an elastomer with a twin screw kneader, there has been a problem in that simply increasing the elastomer ratio causes the proportion of coarse elastomer particles to increase without the elastomer being finely dispersed in the thermoplastic resin, which prevents the original low-temperature durability improving effect from being sufficiently expressed.

SUMMARY

The present technology provides a method for producing a thermoplastic elastomer composition having excellent low-temperature durability.

As a result of conducting extensive research, the present inventors discovered that when an elastomer is fed in a divided manner into the twin screw kneader in a method for producing a thermoplastic elastomer composition using a twin screw kneader, the kneaded product is cooled by the elastomer that is injected later, and the viscosities of the thermoplastic resin and the elastomer approach one another, which causes the elastomer to be finely dispersed in the thermoplastic resin and makes it possible to achieve the desired low-temperature durability improving effect.

That is, the present technology includes the following aspects [1] to [9].

[1] A method for producing a thermoplastic elastomer composition comprising using a twin screw kneader to melt-knead a thermoplastic resin and an elastomer; the twin screw kneader having at least two raw material inlets including a first raw material inlet and a second raw material inlet provided at a position separated by from 15D to 38D on a downstream side from the first raw material inlet, where D is a cylinder inside diameter of the twin screw kneader; the elastomer being fed in a divided manner from the first and second raw material inlets; a proportion of the elastomer fed from the second inlet being from 10 to 60 vol % of a total amount of the elastomer; and the elastomer being melt-kneaded in a kneading zone having a length of from 0.5D to 20D in a cylinder axis direction of the twin screw kneader, at least one kneading zone being respectively provided between the first and second raw material inlets and on a downstream side from the second raw material inlet.

[2] The production method according to [1], wherein a temperature (A) of the elastomer fed from the second raw material inlet is at least 100° C. lower than a resin temperature (T) of a cylinder tip discharge part at the time of kneading.

[3] The production method according to [1] or [2], wherein the total amount of the elastomer is at least 30 parts by volume per 100 parts by volume of a total amount of the thermoplastic resin and the elastomer.

[4] The production method according to any one of [1] to [3], wherein the elastomer is dynamically crosslinked.

[5] The production method according to any one of [1] to [4], wherein the elastomer is at least one type selected from the group consisting of brominated isobutylene-p-methylstyrene copolymers, ethylene-α-olefin copolymers, ethylene-glycidyl methacrylate copolymers, ethylene-ethyl acrylate copolymers, and modified products thereof.

[6] The production method according to any one of [1] to [5], wherein the thermoplastic resin is at least one type selected from the group consisting of ethylene-vinyl alcohol copolymers, polyamide resins, and polyester resins.

[7] A thermoplastic elastomer composition produced by the production method described in any one of [1] to [6].

[8] A pneumatic tire using a film comprising the thermoplastic elastomer composition described in [7].

[9] A hose using a film comprising the thermoplastic elastomer composition described in [7].

With the method of the present technology, it is possible to produce a thermoplastic elastomer composition having excellent low-temperature durability.

BRIEF DESCRIPTION OF THE DRAWINGS

FIG. 1 is a schematic view of an example of a twin screw kneader that can be used in the present technology.

FIGS. 2A-3B include Tables 1-2 illustrating conventional, comparative and working examples.

DETAILED DESCRIPTION

The present technology relates to a method for producing a thermoplastic elastomer composition comprising using a twin screw kneader to melt-knead a thermoplastic resin and an elastomer.

A thermoplastic elastomer composition is a composition in which an elastomer component is dispersed in a thermoplastic resin component, the thermoplastic resin component constituting a matrix phase, and the elastomer component constituting a dispersion phase.

Thermoplastic resins that can be used in the present technology are not particularly limited and can be appropriately selected in accordance with the application of the thermoplastic elastomer composition. Examples of thermoplastic resins include polyamide resins, polyester resins, polynitrile resins, polymethacrylate resins, polyvinyl resins, cellulose resins, fluororesins, imide resins, polystyrene resins, and polyolefin resins. Examples of polyamide resins include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, nylon 66/PP copolymers, and nylon 66/PPS copolymers. Examples of polyester resins include aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyesters, and polyoxyalkylene diimidic acid/polybutyrate-terephthalate copolymers. Examples of polynitrile resins include polyacrylonitrile (PAN), polymethacrylonitrile, acrylonitrile/styrene copolymers (AS), methacrylonitrile/styrene copolymers, and methacrylonitrile/styrene/butadiene copolymers. Examples of polymethacrylate resins include polymethyl methacrylate (PMMA) and polyethyl methacrylate. Examples of polyvinyl resins include polyvinyl acetate (PVAc), polyvinyl alcohol (PVA), ethylene-vinyl alcohol copolymers (EVOH), ethylene-vinyl acetate copolymers (EVA), polyvinylidene chloride (PVDC), polyvinyl chloride (PVC), vinyl chloride/vinylidene chloride copolymers, and vinylidene chloride/methyl acrylate copolymers. Examples of cellulose resins include cellulose acetate and cellulose acetate butyrate. Examples of fluororesins include polyvinylidene fluoride (PVDF), polyvinyl fluoride (PVF), polychlorofluoroethylene (PCTFE), and tetrafluoroethylene/ethylene copolymers (ETFE). Examples of imide resins include aromatic polyamides (PI). Examples of polystyrene resins include polystyrenes (PS). Examples of polyolefin resins include polyethylenes (PE) and polypropylenes (PP).

Of these, at least one type selected from the group consisting of ethylene-vinyl alcohol copolymers, polyamide resins, and polyester resins is preferable from the perspective of air blocking performance.

In order to improve processability, dispersibility, heat resistance, oxidation resistance, or the like, the thermoplastic resin used in the present technology may contain additive ingredients that are generally blended into thermoplastic resin compositions, such as fillers, reinforcing agents, processing aids, stabilizers, and antioxidants, to an extent that does not inhibit the effects of the present technology. A plasticizer should not be added from the perspectives of gas barrier properties and heat resistance, a plasticizer may be added to an extent that does not inhibit the effects of the present technology.

Elastomers that can be used in the present technology are not particularly limited and can be appropriately selected in accordance with the application of the thermoplastic elastomer composition. Examples of elastomers include diene-based rubbers and hydrogenated products thereof, olefin-based rubbers, halogen-containing rubbers, silicone rubbers, sulfur-containing rubbers, and fluorine rubbers. Examples of diene-based rubbers and hydrogenated products thereof include natural rubber (NR), isoprene rubber (IR), epoxidized natural rubber (ENR), styrene butadiene rubber (SBR), butadiene rubber (BR) (high-cis BR and low-cis BR), acrylonitrile butadiene rubber (NBR), hydrogenated NBR, and hydrogenated SBR. Examples of olefin-based rubbers include ethylene propylene rubber (EPM), ethylene propylene diene rubber (EPDM), maleic acid-modified ethylene propylene rubber (M-EPM), ethylene-α-olefin copolymers and modified products thereof such as maleic anhydride-modified ethylene-α-olefin copolymers, for example, ethylene-glycidyl methacrylate copolymers and modified products thereof, ethylene-ethyl acrylate copolymers and modified products thereof such as maleic anhydride-modified ethylene-ethyl acrylate copolymers, for example, butyl rubber (IIR), copolymers of isobutylene and an aromatic vinyl or a diene monomer, acrylic rubber (ACM), and ionomers. Examples of halogen-containing rubbers include halogenated butyl rubbers such as brominated butyl rubber (Br-IIR) or chlorinated butyl rubber (Cl-IIR), brominated isobutylene-p-methyl styrene copolymers (BIMS) and modified products thereof, halogenated isobutylene-isoprene copolymer rubber, chloroprene rubber (CR), hydrin rubber (CHR), chlorosulfonated polyethylene (CSM), chlorinated polyethylene (CM), and maleic acid-modified chlorinated polyethylene (M-CM). Examples of silicone rubbers include methyl vinyl silicone rubber, dimethyl silicone rubber, and methyl phenyl vinyl silicone rubber. Examples of sulfur-containing rubbers include polysulfide rubber. Examples of the fluororubber include vinylidene fluoride rubber, fluorine-containing vinyl ether rubber, tetrafluoroethylene-propylene rubber, fluorine-containing silicone rubber, fluorine-containing phosphazene rubber, and the like.

Of these, at least one type selected from the group consisting of brominated isobutylene-p-methyl styrene copolymers, ethylene-α-olefin copolymers, ethylene-glycidyl methacrylate copolymers, ethylene-ethyl acrylate copolymers, and modified products thereof is preferable from the perspective of durability or processability.

The elastomer used in the present technology may contain additive ingredients that are generally blended into elastomer compositions, such reinforcing agents (fillers) such as carbon black or silica, softening agents, antioxidants, and processing aids, to an extent that does not inhibit the effects of the present technology.

The method for producing a thermoplastic elastomer composition according to the present technology is implemented using a twin screw kneader. The L/D of the twin screw kneader is not particularly limited as long as the present technology can be implemented but preferably satisfies LD=30 to 60. Here, L is the length of the screw of the twin screw kneader in the axial direction, and D is the cylinder inside diameter.

The twin screw kneader used in the present technology has at least two raw material inlets including a first raw material inlet and a second raw material inlet. The second raw material inlet is provided at a position separated by 15D to 38D on the downstream side from the first raw material inlet, where D is the cylinder inside diameter of the twin screw kneader, and preferably separated by 18D to 32D on the downstream side from the first raw material inlet.

At least one kneading zone is respectively provided between the first and second raw material inlets and further downstream from the second raw material inlet in the twin screw kneader used in the method of the present technology. In the kneading zone, the thermoplastic resin and the elastomer are melt-kneaded. The length of each zone in the cylinder axis direction of the twin screw kneader is from 0.5D to 20D and preferably from 1.0D to 10D. When the length is shorter than 0.5D, kneading is insufficient, and the elastomer is not sufficiently dispersed in the thermoplastic resin, which diminishes the durability and extrusion moldability. In addition, when the length is longer than 20D, the thermoplastic resin and the elastomer are excessively kneaded, which causes gel particles or decreases in fluidity and diminishes processability.

The melt kneading temperature in each kneading zone is a temperature of at least the melting point of the thermoplastic resin but is preferably a temperature 20° C. higher than the melting point of the thermoplastic resin such as from 120 to 250° C., for example.

The kneading time is not particularly limited but is preferably from 3 to 15 minutes.

In the method of the present technology, the elastomer is fed in a divided manner from the first and second raw material inlets. The proportion of the elastomer fed from the second raw material inlet is from 10 vol % to 60 vol % and preferably from 10 vol % to 30 vol % of the total amount of the elastomer. When the proportion is less than 10 vol %, sufficient durability cannot be achieved. In addition, when the proportion is greater than 60 vol %, kneading is not performed sufficiently, so the proportion of coarse rubber particles increases, and the processability and durability are diminished.

In order to obtain a thermoplastic elastomer composition having the desired low-temperature durability in the method of the present technology, the temperature (A) of the elastomer fed from the second raw material inlet of the twin screw kneader is preferably at least 100° C. lower and more preferably from 130° C. to 230° C. lower than the resin temperature (T) of the cylinder tip discharge part at the time of kneading. When the elastomer is fed at a temperature A at least 100° C. lower than T, the kneaded product is sufficiently cooled, and the viscosities of the thermoplastic resin and the elastomer approach one another, which causes the elastomer to be finely dispersed in the thermoplastic resin and makes it possible to achieve the desired low-temperature durability improving effect.

The total amount of the elastomer used in the method of the present technology is preferably at least 30 parts by volume and more preferably from 50 to 70 parts by volume per 100 parts by volume of the total amount of the thermoplastic resin and the elastomer.

The feeding location of the thermoplastic resin in the present technology is not particularly limited, and the thermoplastic resin may be fed all at once or in a divided manner. Preferably, at least part of the thermoplastic resin is fed from the first raw material inlet or from a third raw material inlet provided upstream from the first raw material inlet. For example, the thermoplastic resin may be fed all at once from the first raw material inlet or fed all at once from the third raw material inlet, or part of the thermoplastic resin may be fed from the third raw material inlet and the remaining thermoplastic resin may then be fed from the first raw material inlet. Alternatively, part of the thermoplastic resin may be fed from the first raw material inlet or the third raw material inlet and the remaining thermoplastic resin may then be fed from a raw material inlet such as the second raw material inlet, for example, provided downstream from the first raw material inlet. For example, when thermoplastic resins A and B of different types are used, both of the resins A and B may be fed all at once from the first raw material inlet or fed all at once from the third raw material inlet, or the resin A (or the resin B) may be fed from the third raw material inlet and the resin B (or the resin A) may then be fed from the first raw material inlet. Alternatively, the resin A (or the resin B) may be fed from the first raw material inlet or the third raw material inlet and the resin B (or the resin A) may then be fed from a raw material inlet such as the second raw material inlet, for example, provided downstream from the raw material inlet.

The elastomer constituting the dispersion phase of the thermoplastic elastomer composition is preferably crosslinked by means of dynamic crosslinking. By dynamically crosslinking the elastomer, it is possible to fix the matrix phase and the dispersion phase of the thermoplastic elastomer composition. Dynamic crosslinking can be performed by melt-kneading a non-crosslinked elastomer together with a crosslinking agent.

Examples of the crosslinking agent used in dynamic crosslinking include zinc oxide, stearic acid, zinc stearate, magnesium oxide, m-phenylene bismaleimide, alkyl phenol resins and halides thereof, secondary amines (for example, N-(1,3-dimethylbutyl)-N'-phenyl-p-phenylene diamine or polymerized 2,2,4-trimethyl-1,2-dihydroquinoline), and tris-(2-hydroxyethyl)isocyanurate. Of these, zinc oxide, stearic acid, zinc stearate, N-(1,3-dimethylbutyl)-N'-phenyl-p-phenylene diamine, and tris-(2-hydroxyethyl)isocyanurate are preferable.

The amount of the crosslinking agent is preferably from 0.5 to 4.0 parts by mass and more preferably from 1.0 to 2.0 parts by mass per 100 parts by mass of the total amount of the elastomer.

The crosslinking agent is fed from a crosslinking agent inlet provided between the first raw material inlet and the second raw material inlet, for example.

The thermoplastic elastomer composition produced by the method of the present technology is then extruded in a shape such as a film shape, a sheet shape, or a tube shape by an ordinary method from a die attached to the discharge port of the twin screw kneader in the molten state, or the composition is extruded in a strand shape and temporarily pelletized with a resin pelletizer, and the obtained pellets are then formed into a desired film shape, sheet shape, or tube shape in accordance with the application using an ordinary resin molding method such as inflation molding, calendar molding, or extrusion molding.

The thermoplastic elastomer composition of the present technology demonstrates excellent low-temperature durability and fatigue resistance in addition to excellent gas blocking properties, so the composition can be suitably used as an air permeation prevention layer such as an inner liner, for example, of a pneumatic tire, for example, or can be suitably used as an air blocking layer of a hose.

The thermoplastic elastomer composition of the present technology can also be laminated with a tacky adhesive composition so as to form a laminate. The tacky adhesive composition preferably has excellent adhesion with the rubber constituting the pneumatic tire. Although the composition is not particularly limited, examples include compositions containing epoxidized styrene-butadiene-styrene block copolymers, zinc oxide, stearic acid, vulcanization accelerators, and tackifiers. A laminate of the thermoplastic elastomer composition and a tacky adhesive composition can be produced, for example, by coextruding the thermoplastic elastomer composition and the tacky adhesive composition. Since a laminate of the thermoplastic elastomer composition and a tacky adhesive composition has excellent adhesion with the rubber constituting the pneumatic tire, the laminate can be suitably used as an air permeation prevention layer such as an inner liner, for example, of the pneumatic tire.

A commonly used method can be used as the method for producing a pneumatic tire using a film consisting of the thermoplastic elastomer composition of the present technology. For example, the thermoplastic elastomer composition of the present technology is molded into a film having a prescribed width and thickness, and this is attached in a cylindrical shape to a drum for tire molding. Tire members such as a carcass layer, a belt layer, and a tread layer are sequentially attached and layered thereon, and the green tire is removed from the drum for tire molding. Next, by vulcanizing this green tire in accordance with a conventional method, it is possible to produce a desired pneumatic tire using a film using the thermoplastic elastomer composition of the present technology.

A commonly used method can be used as the method for producing a hose using a film consisting of the thermoplastic elastomer composition of the present technology. For example, the thermoplastic elastomer composition of the present technology is extruded onto a mandrel coated with a mold release agent in advance using a cross-head extrusion method with an extruder so as to form an inner tube, and reinforcing threads or reinforcing steel wires are braided on the inner tube using a braiding machine to form a reinforcing layer. The thermoplastic resin is further extruded onto the reinforcing layer to form an outer tube. A layer consisting of another thermoplastic resin and/or an adhesive may also be provided as necessary between the inner tube and the reinforcing layer and between the reinforcing layer and the outer tube. Finally, a hose is obtained when the mandrel is pulled out.

EXAMPLES

The raw materials used in the following working examples and comparative examples are as follows.

Ethylene-vinyl alcohol copolymer (EVOH): Soarnol H4815B manufactured by Nippon Synthetic Chemical Industry Co., Ltd.

Polyamide resin: "UBE Nylon" 1022B manufactured by Ube Industries, Ltd.

Maleic anhydride-modified ethylene butene copolymer (Mah-EB): TAFMER MH7020 manufactured by Mitsui Chemicals, Inc.

Brominated isobutylene-p-methylstyrene copolymer (Br-IPMS): Exxpro (registered trademark) MDX89-4 manufactured by ExxonMobil Chemical Company Ethylene-glycidyl methacrylate copolymer (E-GMA): Bond Fast E manufactured by Sumitomo Chemicals Crosslinking agent: tris-(2-hydroxyethyl)isocyanurate (Seiku A manufactured by Shikoku Chemicals)

In the following conventional examples, working examples, and comparative examples, a twin screw kneader 1 such as that illustrated in the schematic diagram of FIG. 1 (L/D: 49; length in the cylinder 2 axis direction of the twin screw kneader between the third raw material inlet 3c and the first raw material inlet 3a: 6D; length in the cylinder axis direction of the twin screw kneader between the crosslinking agent inlet 5 and the second raw material inlet 3b: 8D) (manufactured by Japan Steel Works, Co., Ltd.) was used. The length in the cylinder axis direction of the twin screw kneader between the first raw material inlet and the second raw material inlet, the length in the cylinder axis direction of the twin screw kneader of the kneading zone provided between the first raw material inlet and the second raw material inlet (hereafter called the first kneading zone 4a), and the length in the cylinder axis direction of the twin screw kneader of the kneading zone provided on the downstream side from the second raw material inlet (hereafter called the second kneading zone 4b) are as shown in Tables 1 and 2 in FIGS. 2A-3B.

(1) Production of a Thermoplastic Elastomer Composition in Conventional Example 1

EVOH (40 parts by volume) and Mah-EB (60 parts by volume) were simultaneously fed all at once from the first raw material inlet. Mah-EB was fed at 30° C. The temperature of the first kneading zone was set to 170° C., and the temperature of the second kneading zone was set to 200° C. A crosslinking agent (1.5 parts by mass per 100 parts by mass of the total amount of the elastomer) was fed into the cylinder from a crosslinking agent inlet provided between the first kneading zone and the second raw material inlet, and this was melted and blended for 5 minutes. The melt-kneaded product was extruded in a strand shape from a die attached to the discharge port. The resulting strand-shaped extrusion product was pelletized with a resin pelletizer so as to obtain a pellet-shaped thermoplastic elastomer composition.

(2) Production of Thermoplastic Elastomer Compositions in Working Examples 1 to 4 and 6 and Comparative Examples 1 and 2

A thermoplastic resin and an elastomer were fed from the first raw material inlet into the cylinder at the volume ratios shown in Tables 1 and 2 in FIGS. 2A-3B. The temperature of the first kneading zone was set to 170° C., and the temperature of the second kneading zone was set to 200° C. A crosslinking agent (1.5 parts by mass per 100 parts by mass of the total amount of the elastomer) was fed into the cylinder from a crosslinking agent inlet provided between the first kneading zone and the second raw material inlet, and this was melted and blended for 5 minutes. The melt-kneaded product was extruded in a strand shape from a die attached to the discharge port. The resulting strand-shaped extrusion product was pelletized with a resin pelletizer so as to obtain a pellet-shaped thermoplastic elastomer composition.

(3) Production of Thermoplastic Elastomer Compositions in Comparative Example 3 and Working Examples 5 and 10

The compositions were prepared in the same manner as in (2) above with the exception that a crosslinking agent was not fed into the cylinder.

(4) Production of a Thermoplastic Elastomer Composition in Working Example 7

EVOH (30 parts by volume) and Mah-EB (40 parts by volume) were fed into the cylinder from the first raw material inlet. The temperature of the first kneading zone was set to 180° C., and the temperature of the second kneading zone was set to 230° C. A crosslinking agent (1.5 parts by mass per 100 parts by mass of the total amount of the elastomer) was fed into the cylinder from a crosslinking agent inlet provided between the first kneading zone and the second raw material inlet, while a polyamide resin (10 parts by volume) and Mah-EB (20 parts by volume) were fed into the cylinder from the second raw material inlet, and these were melted and blended for 5 minutes. The melt-kneaded product was extruded in a strand shape from a die attached to the discharge port. The resulting strand-shaped extrusion product was pelletized with a resin pelletizer so as to obtain a pellet-shaped thermoplastic elastomer composition.

(5) Production of a Thermoplastic Elastomer Composition in Working Example 8

A polyamide resin (50 parts by volume) and Br-IPMS (40 parts by volume) were fed into the cylinder from the first raw material inlet. The temperature of the first and second kneading zones was set to 230° C. Br-IPMS (10 parts by volume) was fed into the cylinder from the second raw material inlet, and this was melted and blended for 5 minutes. The melt-kneaded product was extruded in a strand shape from a die attached to the discharge port. The resulting strand-shaped extrusion product was pelletized with a resin pelletizer so as to obtain a pellet-shaped thermoplastic elastomer composition.

(6) Production of a Thermoplastic Elastomer Composition in Working Example 9

EVOH (30 parts by volume) was fed into the cylinder from the third raw material inlet. EVOH (10 parts by volume) and Mah-EB (25 parts by volume) were then fed into the cylinder from the first raw material inlet. The temperature of the first kneading zone was set to 170° C., and the temperature of the second kneading zone was set to 200° C. A crosslinking agent (1.5 parts by mass per 100 parts by mass of the total amount of the elastomer) was fed into the cylinder from a crosslinking agent inlet provided between the first kneading zone and the second raw material inlet, and this was melted and blended for 5 minutes. The melt-kneaded product was extruded in a strand shape from a die attached to the discharge port. The resulting strand-shaped extrusion product was pelletized with a resin pelletizer so as to obtain a pellet-shaped thermoplastic elastomer composition.

(7) Low-Temperature Durability Evaluation

The resulting pellet-shaped thermoplastic elastomer composition was molded into a sheet with an average thickness of 1 mm using a 40 mm φ single screw extruder with a 200 mm wide T-type die (Plastic Engineering) under extrusion conditions with extrusion temperatures of C1/C2/C3/C4/die=190/200/210/220/220° C., a cooling roller temperature of 50° C., and a taking-up speed of 1 m/minute. Each sheet was punched out into a dumbbell shape, and a low-temperature constant-strain test with 40% dynamic strain at −35° C. was conducted. Measurements were taken 5 times, and the average number of times that the sheets were fractured was calculated as the average fracture number.

Low-temperature durability index (a): Defining the average fracture number of the thermoplastic elastomer composition produced in Conventional Example 1 as 100, the average fracture number of the thermoplastic elastomer composition produced in each of the working examples and comparative examples was indexed.

Low-temperature durability index (b): Without changing the compounding ratios listed in Tables 1 and 2 in each of the working examples and comparative examples, the average fracture number of a thermoplastic elastomer composition produced by simultaneously feeding a thermoplastic resin and an elastomer at once from the first raw material inlet in the same manner as in Conventional Example 1 was indexed by defining the average fracture number of the thermoplastic elastomer composition produced in Conventional Example 1 as 100.

In this evaluation, it was assessed that the low-temperature durability had improved when the ratio of (a) to (b) exceeded 120%.

The test results are shown in Tables 1 and 2 in FIGS. 2A-3B.

Conventional Example 1 is a case in which the thermoplastic resin and the elastomer were fed all at once from the first raw material inlet.

Working Examples 1 to 10 were implemented in accordance with the method of the present technology. A good low-temperature durability improving effect was confirmed in comparison to the case of Conventional Example 1.

Comparative Examples 1 and 2 are examples in which the proportions of the elastomer fed from the second raw material inlet of the twin screw kneader were respectively less than 10 vol % and greater than 60 vol % of the total amount of the elastomer. The desired low-temperature durability improving effect was not achieved in either case in comparison to the case of Conventional Example 1. In addition, it was confirmed from the results of Comparative Example 2 that the desired low-temperature durability improving effect is not achieved when the temperature difference (T−A) between the resin temperature (T) of the cylinder tip discharge part at the time of kneading and the temperature A (° C.) of the elastomer fed from the second raw material inlet is small.

Comparative Example 3 is an example in which the total amount of the elastomer to be fed was reduced (the total amount of the elastomer was 20 parts by volume per 100 parts by volume of the total amount of the thermoplastic resin and the elastomer). When the amount of the elastomer was too small, the desired low-temperature durability improving effect was not achieved.

INDUSTRIAL APPLICABILITY

The thermoplastic elastomer composition obtained with the method of the present technology can be suitably used in a pneumatic tire, a hose, or the like.

What is claimed is:

1. A method for producing a thermoplastic elastomer composition comprising using a twin screw kneader to melt-knead a thermoplastic resin and an elastomer;
   the twin screw kneader having at least two raw material inlets including a first raw material inlet and a second raw material inlet provided at a position separated by 15D to 38D on a downstream side from the first raw material inlet, where D is a cylinder inside diameter of the twin screw kneader;
   the same elastomer being fed in a divided manner from the first and second raw material inlets;
   a proportion of the elastomer fed from the second inlet being from 10 to 60 vol % of a total amount of the elastomer; and
   the elastomer being melt-kneaded in a kneading zone having a length of from 0.5D to 20D in a cylinder axis direction of the twin screw kneader, at least one kneading zone being respectively provided between the first and second raw material inlets and on a downstream side from the second raw material inlet;
   wherein a temperature (A) of the elastomer fed from the second raw material inlet is at least 100° C. lower than a resin temperature (T) of a cylinder tip discharge port at the time of kneading.

2. The production method according to claim 1, wherein the total amount of the elastomer is at least 30 parts by volume per 100 parts by volume of a total amount of the thermoplastic resin and the elastomer.

3. The production method according to claim 1, wherein the elastomer is dynamically crosslinked.

4. The production method according to claim 1, wherein the elastomer is at least one selected from the group consisting of a brominated isobutylene-p-methylstyrene copolymer, an ethylene-α-olefin copolymer, an ethylene-glycidyl methacrylate copolymer, and an ethylene-ethyl acrylate copolymer.

5. The production method according to claim 1, wherein the thermoplastic resin is at least one selected from the group consisting of an ethylene-vinyl alcohol copolymer, a polyamide resin, and a polyester resin.

6. A thermoplastic elastomer composition produced by the method according to claim 1.

7. A pneumatic tire using a film comprising the thermoplastic elastomer composition according to claim 6.

8. A hose using a film comprising the thermoplastic elastomer composition according to claim 6.

* * * * *